W. N. MATHEWS.
GLASS FURNACE.
APPLICATION FILED MAR. 27, 1915.

1,152,828.

Patented Sept. 7, 1915.
4 SHEETS—SHEET 4.

Inventor
William N. Mathews
By N. E. Dunlap
Attorney

UNITED STATES PATENT OFFICE.

WILLIAM NICHOLLS MATHEWS, OF WELLSBURG, WEST VIRGINIA.

GLASS-FURNACE.

1,152,828.   Specification of Letters Patent.   Patented Sept. 7, 1915.

Application filed March 27, 1915. Serial No. 17,489.

*To all whom it may concern:*

Be it known that I, WILLIAM N. MATHEWS, a citizen of the United States of America, and resident of Wellsburg, county of Brooke, and State of West Virginia, have invented certain new and useful Improvements in Glass-Furnaces, of which the following is a specification.

This invention relates broadly to glass furnaces, and specifically to that type of glass furnace known as a pot furnace.

The primary object of the invention is to provide a glass furnace wherein the gas, or other fuel, employed for producing heat is introduced into the combustion chamber from above, thereby dispensing with the usual pit and preventing the burning out of crowns which is incident to the introduction of fuel from below, as has hitherto been the universal practice, and, further, obviating to a large extent the objectionable heating of the factory floor adjacent to the furnace.

A further object is to provide a glass furnace of the character mentioned having flues whereby escaping heated products of combustion are conducted throughout a tortuous path and are utilized for heating fresh drafts or currents of air which are introduced into the combustion chamber, thereby greatly facilitating combustion. And a still further object is to provide, in a furnace of the character mentioned, means whereby much of the heat which has heretofore been permitted to escape from the furnace through the working openings is conducted away and prevented from discharging into the factory, thereby relieving the workmen and attendants from the excessive heat conditions which obtain in most factories.

With these and other important objects in view, the invention resides in the features of construction, arrangement of parts and combinations of elements which will hereinafter be exemplified, reference being had to the accompanying drawings, forming a part of this specification, in which—

Figure 1:
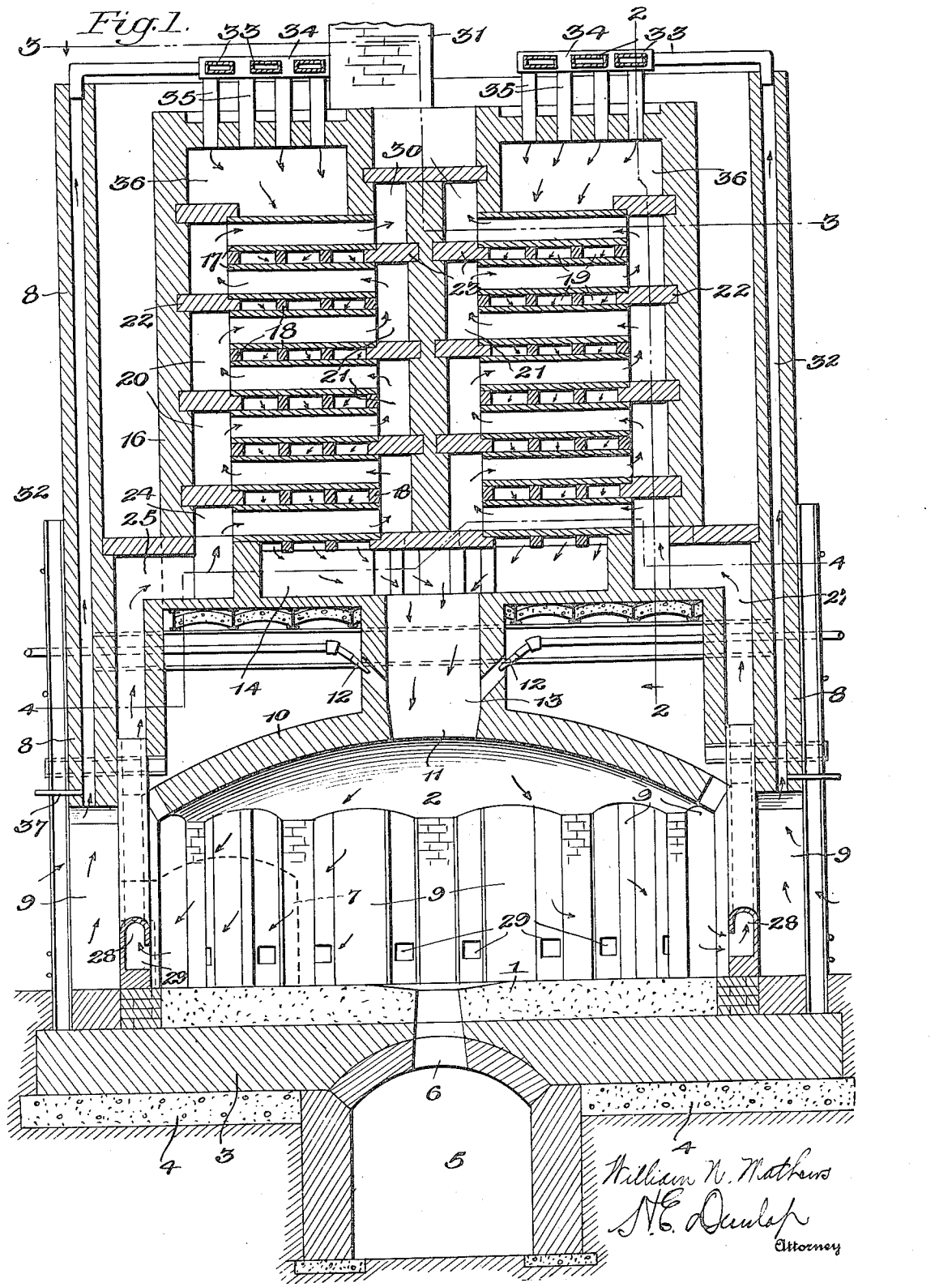
Figure 2:
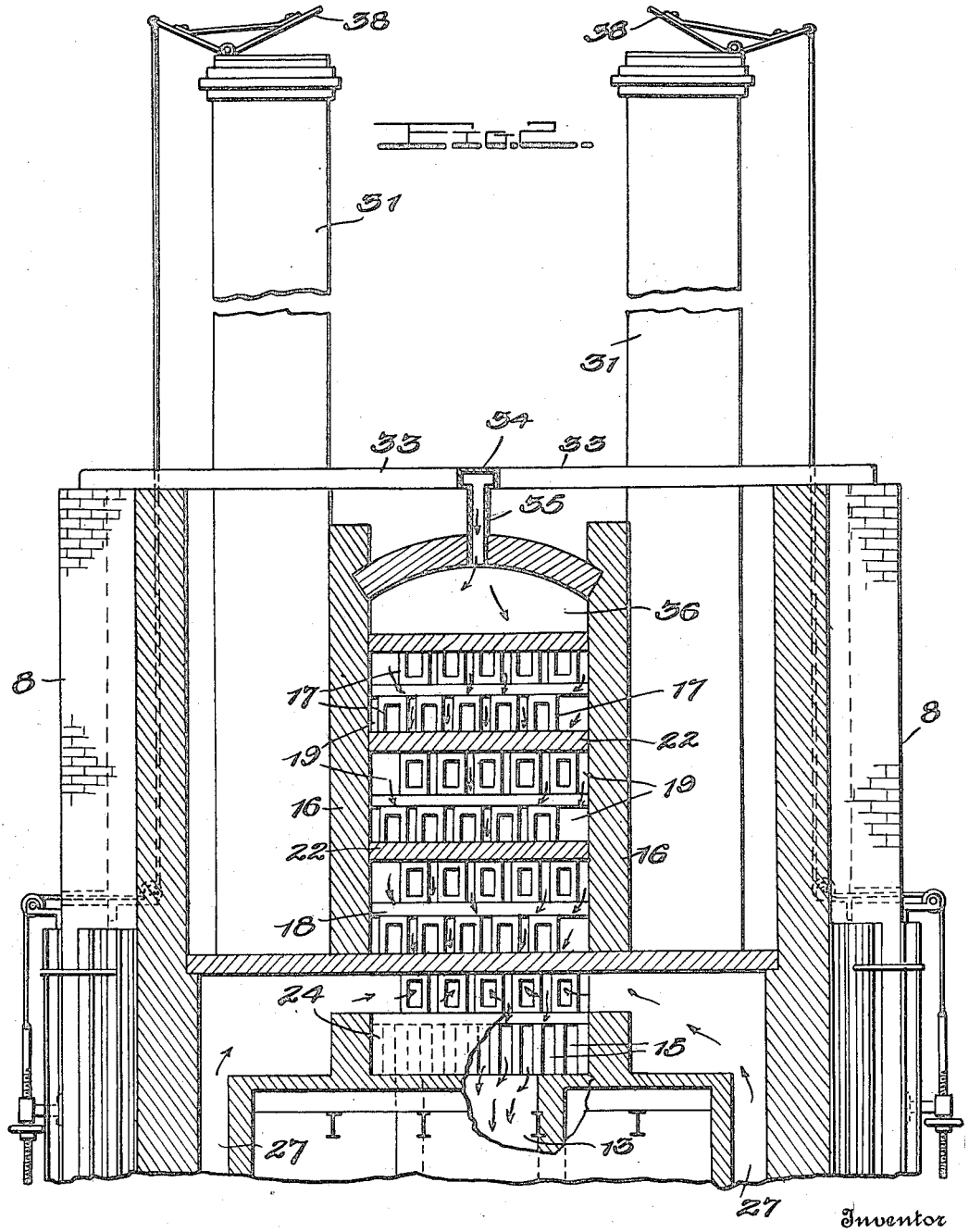
Figure 3:
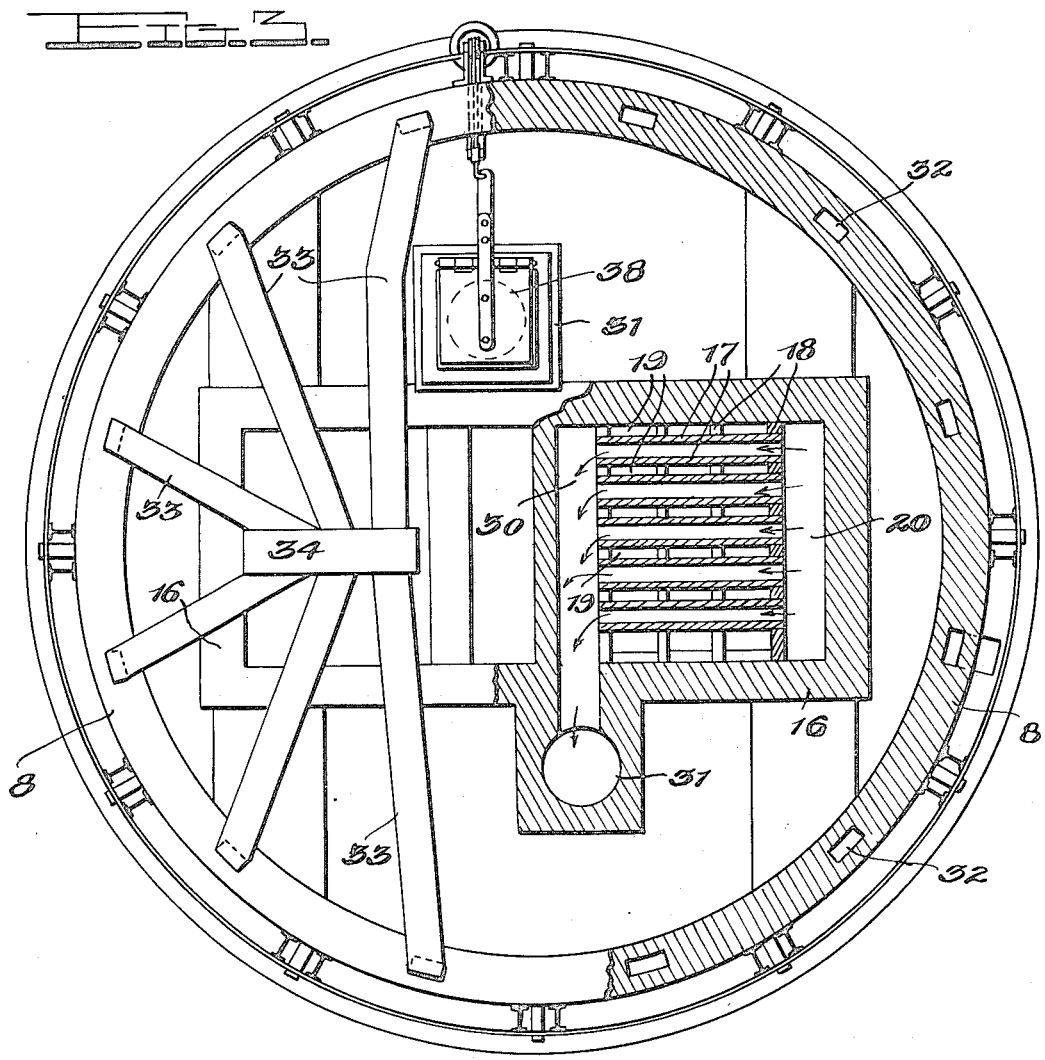

Figure 1 is a vertical section of my invention; Fig. 2 is an enlarged partial vertical section on the line 2—2 of Fig. 1; Fig. 3 is a partially top plan and partially a horizontal section, said section being taken on the line 3—3, Fig. 1; and Fig. 4 is a section taken on the line 4—4, Fig. 1.

Referring to said drawings, in which like designating characters distinguish like parts throughout the several views—

1 indicates the bottom or floor of the furnace combustion chamber 2, the same being flush with the level of the factory floor and being composed of suitable material, as bench clay. Said bottom rests upon a suitable base 3 of brick, or other similar material, which is in turn mounted upon a suitable foundation, as a layer of concrete 4. Located centrally with respect to the combustion chamber 2 and beneath the floor thereof is a glass cave 5 of suitable form which communicates through an opening 6 with said chamber, said cave serving as a receptacle into which molten glass flows from the floor 1 in cases where melting pots 7 are broken, allowing their contents to escape.

Figure 4:
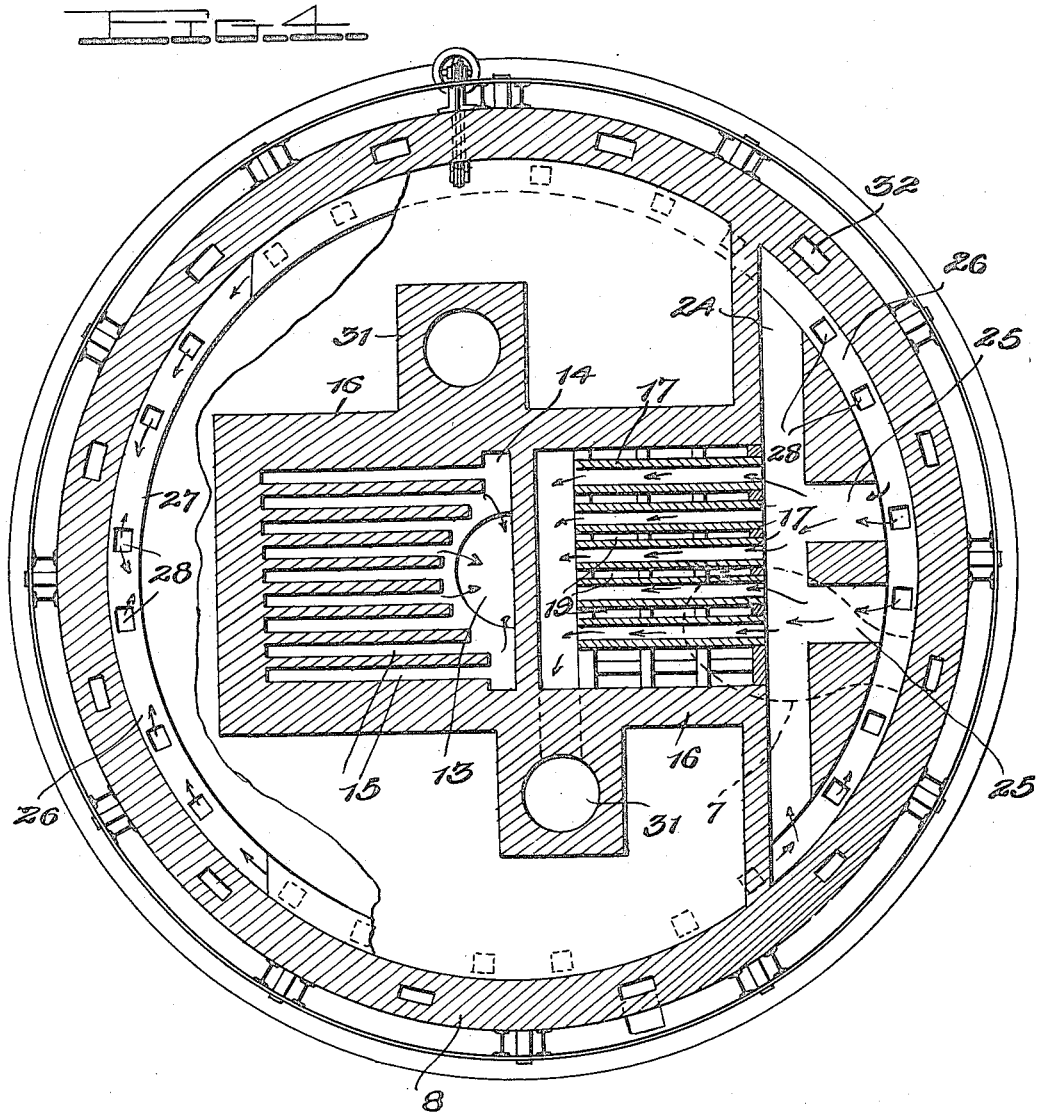

The outer wall 8 of the furnace, or that portion thereof which incloses the combustion chamber, is preferably circular in form, as shown in Figs. 3 and 4, and has provided therein at spaced intervals arched openings 9 through which access is had to the outer, or open, ends of the ordinary glass melting pots 7 which are mounted within the combustion chamber in the usual manner, as indicated in dotted lines in Figs. 1 and 4.

A crown 10 of suitable refractory material overlies the combustion chamber, and at a central point therein is provided an opening 11 through which a continuous blast of gas, oil, or other suitable fuel, enters said chamber, as from suitably located blast nozzles 12. Said opening 11 communicates through a vertical walled passage 13 with a chamber 14, most clearly shown in Fig. 4, into which lead a plurality of air passages 15. A heated fresh air supply issues from said air passages 15 and enters the combustion chamber with the blasts of fuel for facilitating combustion.

The chamber 14 forms a portion of an air-heating chamber located above the combustion chamber and inclosed by outer walls 16. Said air-heating chamber is divided into two or more compartments, each having therein a plurality of superposed tiers of hollow blocks 17 of tile or other suitable material, for conducting the heated products of combustion which escape from the combustion chamber, the blocks composing each tier being disposed at suitably spaced distances apart, as shown in Figs. 2, 3, and 4, and the tiers being separated by interposed transversely disposed space-bars 18, whereby air passages 19 are afforded between said blocks.

The blocks 17, excepting the lowermost and uppermost tiers thereof, have communication at their outer and inner ends respectively with passages 20 and 21 which have a height corresponding to that of two superposed tiers of blocks, as shown in Fig. 1, said passages 20 and 21 being respectively separated by headers 22 and 23. The blocks of the lowermost tier have communication at their outer ends with a chord-like horizontal passage 24 which communicates, as at its ends and through passages 25, with the open or uncovered substantially quadrantal portion 26 of a circular horizontal channel 27, most clearly shown in Fig. 4, provided in the outer wall of the structure. Leading into said channel 27 are the upper ends of a plurality of upright flues 28 which are located in the furnace walls between the positions occupied by the arched openings 9, and which communicate at their lower ends through inwardly opening ports 29 with the interior of the combustion chamber at points at or near the floor thereof.

From the foregoing it will be understood that egress of heated products of combustion from the combustion chamber is had through the ports 29 and flues 28 to the circular channel 27, thence through the quadrantal uncovered portions of the latter to the passages 24 leading to the blocks of the various compartments, thence through the blocks 17 of the lowermost tier of each compartment to the lower space 21, thence through the next tier of blocks thereabove to the space 20, thence back through the next tier thereabove to the next above space 21, and so on, back and forth through the various tiers, as indicated by arrows in Fig. 1, and from the uppermost tier into a horizontal passage 30 leading to a suitably located stack 31. As herein depicted, the air-heating chamber is divided into two compartments, the passages in the blocks of each compartment communicating with a separate stack 31.

Located within the outer circular wall 8 of the furnace is a series of vertical air flues or conduits 32, one leading from the arch portion of each of the arched openings 9 directly in front of and over the mouth of the pot 7 which is associated therewith in order that the draft of said conduit shall act to intercept or take up much of the waste heat which issues from said pot and which would otherwise be discharged into the factory to the discomfort of the workmen, particularly to those who must work directly in front of said opening 9. Fresh air drawn into the flues or conduits 32 is primarily heated by contact with the heat issuing from the pot, as aforesaid. Said flues or conduits communicate at their upper ends with conducting tubes 33 which lead to suitably located junction inclosures 34 from which the fresh air is conducted through tubes 35 into chambers 36 forming parts of the air heating chamber, whence it passes, as is most clearly shown in Fig. 2, downwardly over and around the blocks 17 of the various tiers which have become heated by the passage therethrough of the heated products of combustion escaping from the combustion chamber, as hereinbefore described; and in its said passage the air absorbs heat from contact with said blocks so that, when it issues from the air passages 15 into the chamber 14 and passes through the passage 13 into the combustion chamber, it is fully prepared for mixing with the gas for producing combustion of a most efficient character.

Suitable dampers, as 37, are adapted to be operated for controlling the draft through each of the air conduits 32, and suitably operated dampers, as 38, are arranged for controlling the draft for the heated products of combustion, the last mentioned dampers having any suitable location, as at the tops of the stacks.

It will of course be understood that structural steel beams and suitably trussed framework will be utilized as and where required in the construction of the furnace for sustaining the weight necessarily imposed above the crown of the combustion chamber.

Since the arrangement and disposition of the parts composing the framework involve only the expected skill of a builder, I have not considered it necessary to describe the same herein in detail.

What is claimed is:

1. A glass melting pot furnace comprising a combustion chamber, the wall thereof having arched openings therein and in which the pots are located, said wall extending upward above the combustion chamber, a fresh air heating chamber superposed over the combustion chamber and within said wall, vertical flues extending through the wall and having their upper ends opening at the upper end of the wall tubes rising from the top of the heating chamber and horizontally disposed tubes affording communication between the upper ends of the flues and first named tubes, as and for the purpose set forth.

2. A glass melting pot furnace comprising a combustion chamber having in its wall arched openings within which the pots are located, said wall extending upward above the combustion chamber, a fresh air heating chamber superposed over the combustion chamber and within said wall, vertical flues extending through the wall, the upper end of the flues opening at the top of the wall and the lower end of said flues opening at the arches of the openings, a plurality of vertical tubes supported by the top of the fresh air heating chamber, casings supported by the upper ends of the tubes and common to certain of said tubes, and horizontally disposed tubes having one of their ends attached to the casings and their other end engaged in the upper ends of the flues, whereby exterior air is conducted to the fresh air heating chamber.

In testimony whereof, I affix my signature in presence of two subscribing witnesses.

WILLIAM NICHOLLS MATHEWS.

Witnesses:
   ETTA FEGAN,
   J. H. MATHEWS.